United States Patent
Acevedo-Aviles et al.

(10) Patent No.: US 7,502,810 B2
(45) Date of Patent: Mar. 10, 2009

(54) TAGGING OF FACET ELEMENTS IN A FACET TREE

(75) Inventors: Joel C. Acevedo-Aviles, Gurabo, PR (US); Mario Gerald Ceste, Jr., Herndon, VA (US); John Hans Handy-Bosma, Cedar Park, TX (US); J. Christopher Hawley, Montrose, PA (US); Raymond Lee, Montpelier, VT (US); Matthew Norman Roy, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 11/136,657

(22) Filed: May 24, 2005

(65) Prior Publication Data

US 2006/0271565 A1    Nov. 30, 2006

(51) Int. Cl.
G06F 7/00 (2006.01)
G06F 17/00 (2006.01)

(52) U.S. Cl. .................. 707/102; 706/20; 707/104.1; 715/201; 715/205

(58) Field of Classification Search .............. 707/4, 707/10, 102, 104.1; 715/513, 500, 201, 205; 706/20
See application file for complete search history.

(56) References Cited

U.S. PATENT DOCUMENTS

| | | | |
|---|---|---|---|
| 5,903,902 A * | 5/1999 | Orr et al. ............... 715/517 |
| 5,933,822 A | 8/1999 | Braden-Harder et al. ....... 707/5 |
| 5,956,737 A * | 9/1999 | King et al. .............. 715/517 |
| 6,169,986 B1 | 1/2001 | Bowman et al. ............ 707/5 |
| 6,285,366 B1 * | 9/2001 | Ng et al. ............... 715/853 |
| 6,327,628 B1 * | 12/2001 | Anuff et al. ............ 719/311 |
| 6,519,586 B2 * | 2/2003 | Anick et al. ............. 707/3 |
| 6,668,251 B1 | 12/2003 | Goldberg ................ 707/5 |
| 6,678,679 B1 | 1/2004 | Bradford ................ 707/5 |
| 6,766,316 B2 | 7/2004 | Caudill et al. ........... 707/3 |
| 6,789,076 B1 | 9/2004 | Dutta ................... 707/5 |
| 7,146,362 B2 * | 12/2006 | Allen et al. ............ 707/5 |
| 7,219,102 B2 * | 5/2007 | Zhou et al. ............ 707/101 |
| 7,392,250 B1 * | 6/2008 | Dash et al. ............. 707/5 |

(Continued)

OTHER PUBLICATIONS

JavaServer Faces, Apr. 1, 2004, O'Reilly Media, pp. 1-18.*

(Continued)

*Primary Examiner*—Pierre M Vital
*Assistant Examiner*—Christopher P Nofal
(74) *Attorney, Agent, or Firm*—Yee & Associates, P.C.; Libby Z. Handelsman

(57) ABSTRACT

A tagging application (TA) comprising a web interface program (WIP) and a tagging program (TP). The WIP presents the facet tree by displaying user selected elements of the facet tree along with an activation method for selecting a facet element and assigning a value to the selected facet or facet element. Facets and facet elements are tagged by selecting a value representing the facet element. Facets and facet elements are eliminated by choosing and applying a tagging scenario. After selecting a tagging scenario, and indicating that it is to be applied to the facet element, the TP takes the selected value and applies the selected tagging scenario to populate the tagging for the user in accordance with the tagging scenario. Once the tagging is populated, the TP returns the tagged facet tree to the user. Explanatory notes may be provided to the user with the tagged tree.

1 Claim, 4 Drawing Sheets

U.S. PATENT DOCUMENTS

| | | | |
|---|---|---|---|
| 2001/0037345 A1* | 11/2001 | Kiernan et al. | 707/513 |
| 2002/0091661 A1 | 7/2002 | Anick et al. | 707/1 |
| 2002/0091696 A1* | 7/2002 | Craft et al. | 707/10 |
| 2002/0111792 A1* | 8/2002 | Cherny | 704/8 |
| 2003/0079177 A1* | 4/2003 | Brintzenhofe et al. | 715/500 |
| 2006/0106876 A1* | 5/2006 | MacGregor | 707/104.1 |
| 2007/0118542 A1* | 5/2007 | Sweeney | 707/100 |
| 2007/0136221 A1* | 6/2007 | Sweeney et al. | 706/20 |
| 2008/0010264 A1* | 1/2008 | Morton et al. | 707/4 |
| 2008/0021925 A1* | 1/2008 | Sweeney | 707/104.1 |

OTHER PUBLICATIONS

Priss, Uta., "Faceted Knowledge Representation", Dec. 5, 2000, Linkoping University Electronic Press, Linkoping Electronic Articles in Computer and Information Science, pp. 1-14.*

Stoica et al., "Automating Creation of Hierarchical Faceted Metadata Structures," 2007, Association for Computational Linguistics, Proceedings of NAACL HLT 2007, pp. 244-251.*

Priss, Uts., "A Graphical Interface for Conceptually Navigating Faceted Thesauri", 1998, Indiana University, School of Library and Information Science, pp. 1-11.*

Priss, Uta. "Faceted Information Representation", 2000, Shaker Verlag, Working with Conceptual Structures. Proceedings of the 8 Conference on Conceptual Structures, pp. 84-94.*

* cited by examiner

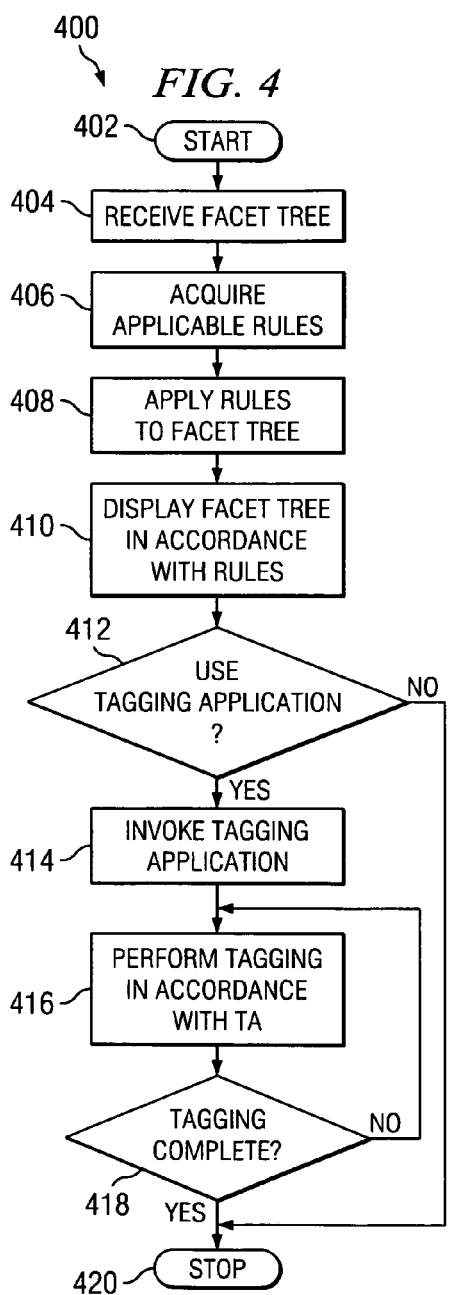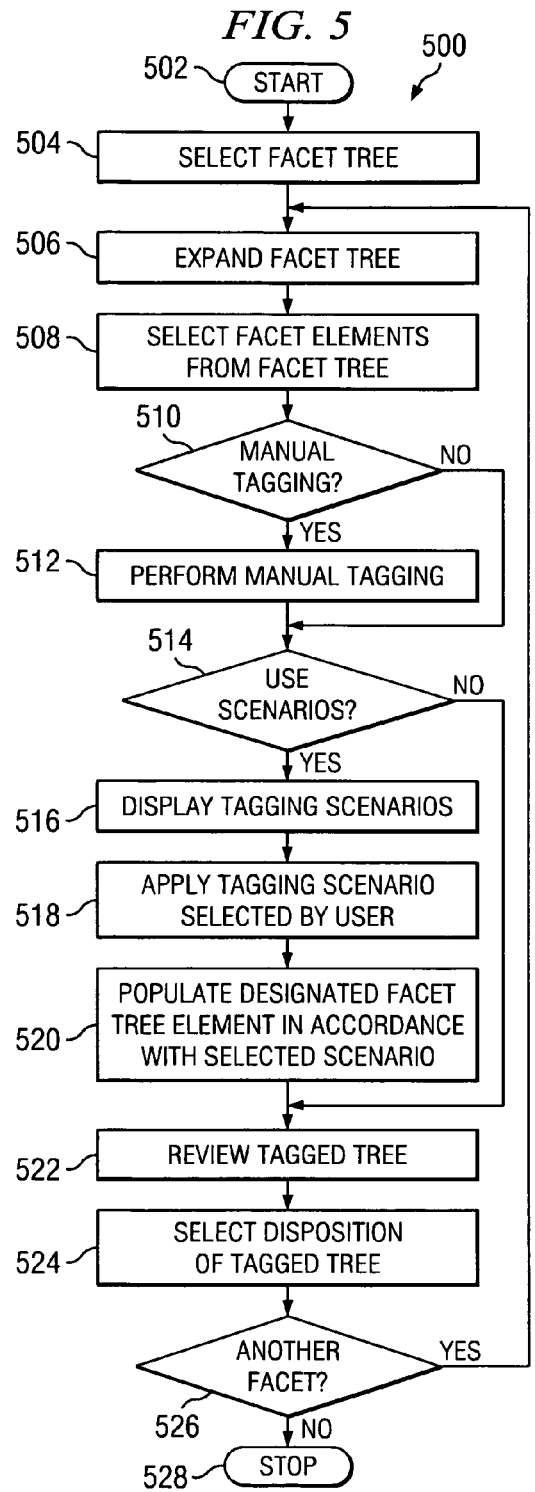

TAGGING OF FACET ELEMENTS IN A FACET TREE

CROSS-REFERENCE TO RELATED APPLICATION

The present invention is related to the subject matter of U.S. patent application Ser. No. 11/136,658, entitled "Method and apparatus for configuration of facet display including sequence of facet tree elements and posting lists," incorporated herein by reference.

FIELD OF THE INVENTION

The present invention is directed to database access in general, and to a method and apparatus for scenario based automation of tagging in a faceted tree in particular.

BACKGROUND OF THE INVENTION

Vast amounts of digital information are available to users through the interconnection of computers and storage by the Internet. Indeed, traditional paper records can be scanned and retained electronically. Emails or instant messages between a company's engineers, planners, or financial officers can have the same or greater significance as formal memorandums or journal articles in a knowledge database. Although available in great quantity, digital information must be accessed in order to be used efficiently and profitably. Typical search methods use queries consisting of a Boolean combination of words and phrases which return documents containing words or phrases that match the search query. Imprecision and ambiguities in the words and phrases affect the effectiveness of searches. Refining a search takes time and skill and a user's search capability usually improves with practice and experience.

However, businesses need fast and reliable search capabilities that are not dependent on a user's skill and experience. Speed and reliability are improved by a search capability that precludes a null result. A null result occurs when desired information is not present in the data base, or the desired information is present, but the search term fails to locate the information. Speed and reliability are improved by a search that is controlled so that users are logically directed to the sought after information without distractions by non-relevant information. Thus the record count of documents responsive to a search should never be zero, and should include only documents that are relevant to the search.

In addition to speed and reliability, businesses need a search capability that can restrict accesses to its total amount of digital information. For example, not all employees have a need to access all information. Trade Secret information, while part of the total universe of a business's digital information, must have access limited only to those with proper authorization. Moreover, one division of a corporation may not need access to another division's information. Employee files including health records and financial data must be protected in accordance with various State and Federal laws. Thus the need for information access with speed and reliability is affected by equally important needs to restrict access where appropriate.

Personnel responsible for organizing the universe of a businesses' digital information have found that a controlled search can be achieved by a faceted search using a facet tree. A facet tree is a categorization scheme for hierarchially structured data and content records where the facets and facet elements of the tree guide the search, and a posting list of records is associated with each facet element. A facet is a node in the hierarchial network and a facet may have any number of facet elements. The total number of records in a facet is the sum total of all records in the posting lists of the facet elements beneath the facet in the facet tree.

A faceted search is conducted by a faceted search engine. Selection of a facet (a word or phrase) causes the faceted search engine to present the next set of facets, and so on along the facet tree until a final facet is reached and the facet elements are displayed. When the user selects one of the facet elements, the documents on the associated posting list are displayed. The relationship of the facets to each other and of the facets to the facet elements is created by tagging. In general, a tag is one or more characters attached to a set of data that contain information about the set, including its identification. By tagging is meant assigning a value to a facet so that it is identified with another facet in a hierarchical relationship and assigning a value to a facet element so that it is identified with a particular facet.

Current approaches to faceted search are based upon the tagging of data and facet elements in a strict parent/child relationship. Using a faceted search engine, end users choose one facet or facet element at a time. Document or data record counts are displayed in conjunction with the facet elements, such that end users are aware of the total number of records and also how many data records exist at a given facet element within a facet. The total number of records means the number of records for all of the combined facets and facet elements that have been selected.

Faceted search has the advantage of eliminating null results when end users are searching for records across many combined dimensions. To do this, data records that are tagged to a facet element are also made available at facet levels. By way of example, a user might use a faceted search engine to locate content in geographical, industry, and technology facets by choosing "Europe," "Retail," and "Supply Chain" as facets. When one does this, all of the records in posting lists identified with the facets of Europe, Retail, and Supply Chain are aggregated and returned. The total number of records returned is the set intersection of all of the data records rolled up to Europe through Retail and Supply Chain.

Another form of faceted search is a conversational search. In a conversational search, end users are presented with a series of questions derived from or tagged to a facet hierarchy, and the answers given by the end users result in faceted responses rendered by a conversational search engine. The response may include search engine results at the record level finding, for example, documents, titles, abstracts, and other information about those documents. The response may also include navigation from the facet that the question was asked about, to a succeeding facet or facet element. In a conversational scheme, the semantic content of the questions matters, and so the order in which the questions are presented is important.

Current methods for tagging of content and data records for faceted and conversational search are tedious, manually intensive, and prone to error. When content is tagged by content providers, authors, or other editorial roles, it involves human selection of elements from a faceted categorization scheme. The manual tagging solutions currently offered by content management providers require selection of single elements in combination. This results in a much higher number of mouse clicks, and a greater amount of time for tagging each record or document to be presented via a faceted or conversational search rendering engine. Tagging documents manually is often cost-prohibitive because of the number of steps required to select each element in a number of deep hierarchical structures.

Businesses have a need to apply policies to tagging to meet requirements for restricted access for security and legal reasons, but also to apply policies to tagging to promote the efficiency of providing results to end users. Automated tagging algorithms exist such as the Eureka algorithm and software from IBM Research. Other automated tagging algorithms are known. For example, United States Patent Application 2002/0091661, entitled "Method and Apparatus for Automatic Construction of Faceted Terminological Feedback for Document Retrieval" (the '661 application), discloses a method for extracting key informational concepts or "facets" from a collection of documents. In the '661 application, facets are chosen heuristically based on lexical dispersion. As used in the '661 application, lexical dispersion is "a measure of the number of different words with which a particular word co-occurs within such syntactic contexts." The facets and their corresponding lexical constructs provide a structured summary of the contents of a result set.

However, these automated solutions rely on factors such as word frequency in a document and cannot tag documents in accordance with business rules. In order to tag data records and documents in accordance with a stated policy, a person must manually perform the tagging according to specific business rules. While algorithms are capable of approximating human tagging based on semantic categorization, they cannot perform tagging in accordance with policies. Additionally, each time a tagging policy changed, the algorithm would need to be changed. Therefore, although labor intensive, human tagging is necessary to make the policy distinctions that cannot be made by a machine.

What is needed is a solution that allows for rapid selection of tagging facets and facet elements in a facet tree by eliminating repetitive user actions so that a user can quickly tag data records, documents, or collections of documents to a given facet tree via navigation of the elements in a tree format for a given facet.

SUMMARY OF THE INVENTION

The invention that meets the needs identified above is a tagging application (TA) comprising a web interface program (WIP) and a tagging program (TP). The TA provides instructions to a server connected to storage containing a facet tree database, a scenario database and a rules database.

The WIP comprises a user interface and a set of servlets. The user interface comprises one or more Java Server Pages (JSP's). The servlets read the facet element to be displayed from the facet tree database, acquire any associated rules for tagging scenarios based upon the particular facet element from the rules database, and acquire any associated rules based on end user characteristics from the rules database. The servlets apply the rules to the facet tree before presentation to the user on the user interface so that end users who are to tag data and content records only see the portions of the facet tree they are authorized to see and only have available the tagging scenarios that are applicable to their situation. The servlets make the applicable tagging scenarios available to the user at the user interface.

The WIP presents the facet tree by displaying elements of the facet tree selected by the user along with a known activation method for the user to select a facet element and to assign a value to the selected facet or facet element. For example, the user may expand the facet tree by clicking on a facet or facet element or by using a toggle button. The user may then assign a value to a facet or facet element by clicking a checkbox, or using any other known method. The user may proceed to manually tag each facet and facet element by selecting a value representing the facet element to be tagged. The user may also eliminate manual selection of many of the facets and facet elements by choosing a tagging scenario and then applying the tagging scenario.

Once the user has selected a value for the facet element to which a scenario is to be applied, the user accesses the available tagging scenarios by activating a user interface control such as a selection button, a drop-down list, or a link. Alternatively, the user may navigate to a specific JSP for a given tagging scenario. Once the user identifies the available tagging scenarios associated with the selected element, the user selects a tagging scenario.

Once the user has selected a tagging scenario, and has indicated that it is to be applied to the facet element, the TP takes the selected value and applies the selected tagging scenario to populate the tagging for the user in accordance with the tagging scenario. Once the tagging has been populated, the tagging program returns the tagged facet tree to the user at the user interface. Explanatory notes may be provided to the user along with the tagged tree.

The tagged tree can be saved, modified according to a different tagging scenario if one is available, canceled, or saved in draft format for review or other workflow. Moreover, the TA can be combined with an automated tagging program to allow users to validate or invalidate selections made by one or more algorithms or standardized tagging schemes.

These and other objects of the invention will be apparent to those skilled in the art from the following detailed description of a preferred embodiment of the invention.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 4 is a flowchart of the logic of the Web Interface Program (WIP); and

FIG. 5 is a flowchart of the logic of the Tagging Program (TP).

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software" refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Tagging Application (TA)."

As used herein, the term "inverted index" shall mean an index of words or phrases where each word or phrase in the index is associated with a list of texts, and each word or phrase is also associated with the location within each of the texts where the word or phrase occurs, so that when the inverted index is accessed by a search engine, each word or phrase in the index can be located and the location of the word or phrase in each of the texts containing the word phrase can be displayed. As used herein, the term "tagging" means assigning a value to a word or data record to (1) select the word as a facet or a facet element, (2) to link the facet or facet element to another to facet or facet element, or (3) to link a data record to a facet element. As used herein, the term "posting list" means one or more values assigned to a data record and linked to a facet element where the list of values will be displayed when the facet element is activated, and each of the data records will be displayed when the value in the posting list is activated. As used herein, the term "facet rendering engine" means a program that will display a file or inverted index that has been tagged as a facet tree.

Figure 1:
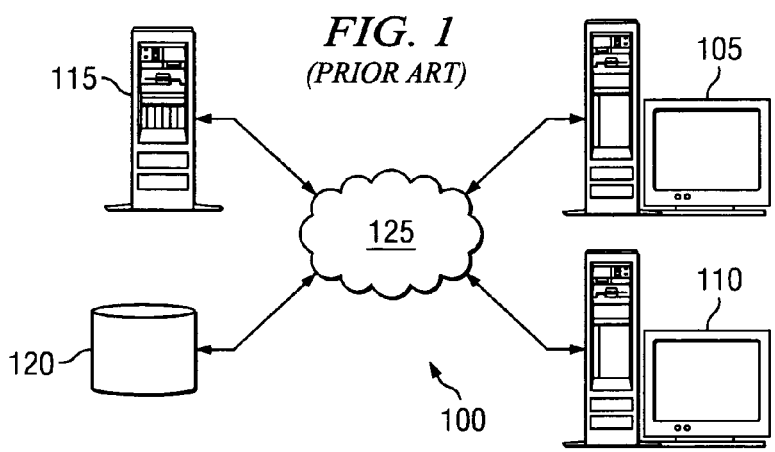
FIG. 1 represents a representative network in which the invention may be implemented.

The TA is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2A:
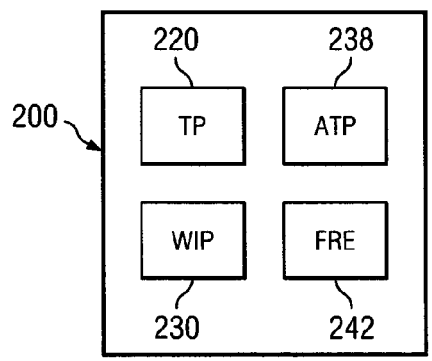
FIG. 2A represents storage in a server in which the invention resides.

WIP 230 and TP 220 typically are stored in a memory, represented schematically as memory 200 in FIG. 2A. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2A is included merely as a descriptive expedient and does not necessarily reflect any particular physical embodiment of memory 220. As depicted in FIG. 2A, memory 200 contains Web Interface Program (WIP) 230, and Tagging Program 220. Memory 200 further includes Automatic Tagging Program (ATP) 238 and Facet Rendering Engine (FRE) (242).

Figure 2B:
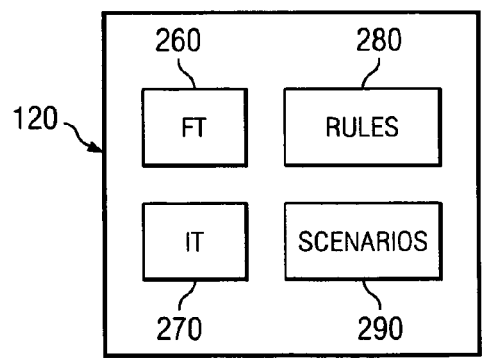
FIG. 2B represents storage connected to the server by the network and containing files and databases necessary to the invention.

Tagging Application (TP) 220 interacts with a number of databases and files located on a representation of remote storage 120 depicted in FIG. 2B. Remote storage 120 contains facet tree database 260, inverted index database 270, rules database 280 and scenario database 290.

Figure 3:
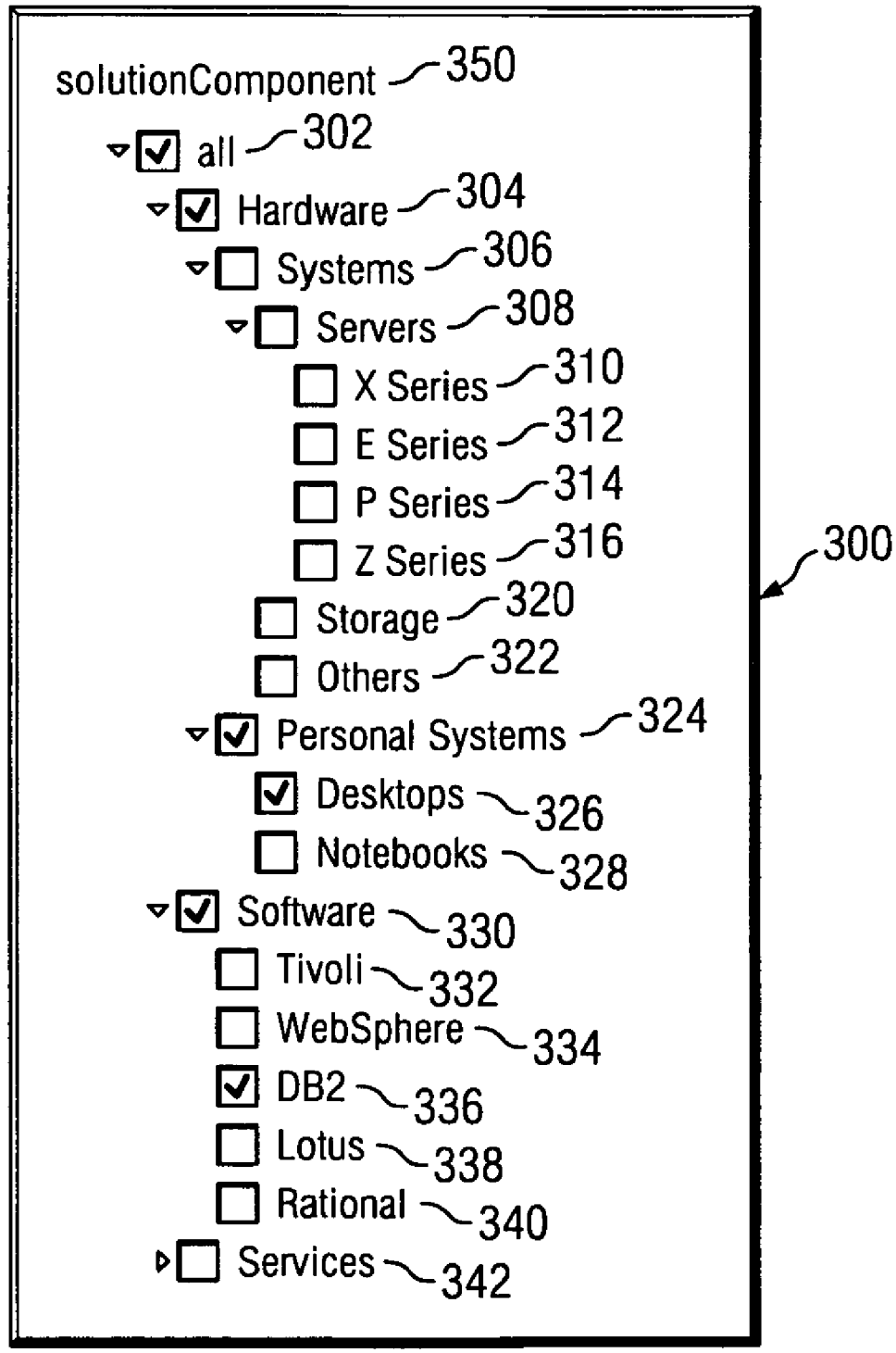
FIG. 3 represents a facet tree presented for tagging on a user interface of the invention.

FIG. 3 depicts user interface (UI) 300 displaying facet tree 350 labeled as solutionComponent. Facet tree 350 has parent node all 302 and child nodes Hardware 304, Software 330 and Services 342. Hardware 304 is a parent node to child nodes Systems 306 and Personal Systems 324. Systems 306 is a parent node to child nodes Servers 308, Storage 320, and Others 322. Personal Systems 324 is a parent node to child nodes desktops 326 and notebooks 328. Software 330 is a parent node to child nodes "Tivoli" 330, WebSphere 332, DB2 334, lotus 338 and rational 340. Facet tree 350 is an example of a facet tree or portion of a facet tree presented for tagging. Each node level is indented and preceded by a checkbox. Downward pointing arrows indicate the direction of expansion. In FIG. 3, all 302 has been checked, but at the second node level only Hardware 304 and Software 330 have been checked for tagging. Thus, when facet rendering engine 242 displays facet tree 350 only Hardware 304 and Software 330 will be displayed as child nodes to all 302. In like manner, only Personal Systems 324 will be displayed as a child node to Hardware 304, and only Desktops 326 will be displayed as a child to Personal Systems 324. Likewise, only DB2 334 will be displayed as a child of Software 330. Each element which has a child a node is a facet. Each element that has a parent but no child nodes for expansion is a facet element. Facet elements may be linked to a posting list (not shown) and documents from the posting list may be tagged to the facet elements. A complete facet tree may contain hundreds of facets, thousands of facet elements and millions of documents in posting lists. Manually tagging facets to facets, facets to facet elements, and documents in posting lists to facet elements can involve millions of individual user actions such as the clicking of checkboxes in the example.

FIG. 4 depicts a flow chart of WIP 400. WIP 400 starts on the server on which WIP 400 resides (such as server 115 in network 100) when Tagging Program 500 is activated (402). WIP 400 receives a facet tree from the facet tree database at remote storage 120 (404). WIP 400 sends a request to a rules database such as rules database 280 in remote storage 120 of network 100, and acquires rules applicable to the facet tree (406). WIP 400 applies the rules to the facet tree (408) and displays the facet tree in accordance with the rules (410). WIP 400 determines whether the user desires to use Tagging Application (TA) 500 (412). If so, TA 500 is invoked (414) and tagging is performed in accordance with TA 500 (416). If not, WIP 400 stops (420). If TA 500 is invoked, a determination is made whether the user has completed tagging (418). If the user has not completed tagging, WIP 400 goes to step 416, and if the user has completed tagging, WIP 400 stops (420).

FIG. 5 depicts a flow chart of Tagging Application (TA) 500. TA 500 begins (502) and the user selects a facet tree (504). The user expands the facet tree (506) and selects a facet element from the facet tree (508). TA 500 determines if the user will perform manual tagging (510). If so, the user performs manual tagging in accordance with user actions (512). If not, TA 500 determines whether the user will use scenarios for tagging (514). If not, TA 500 goes to step 522. If so, TA 500 displays the tagging scenarios and prompts the user to make a selection (516).

When the user has selected a tagging scenario and indicated a desire to apply the selected tagging scenario, TA 500 applies the scenario (518) and populates the facet tree with appropriate tags (520). The user reviews the tagged facet tree (522), and selects a disposition of the tagged facet tree (524). If the user wants to tag another facet tree (526), TA 500 goes to step 506, and if not, TA 500 stops (528).

Figure 6:
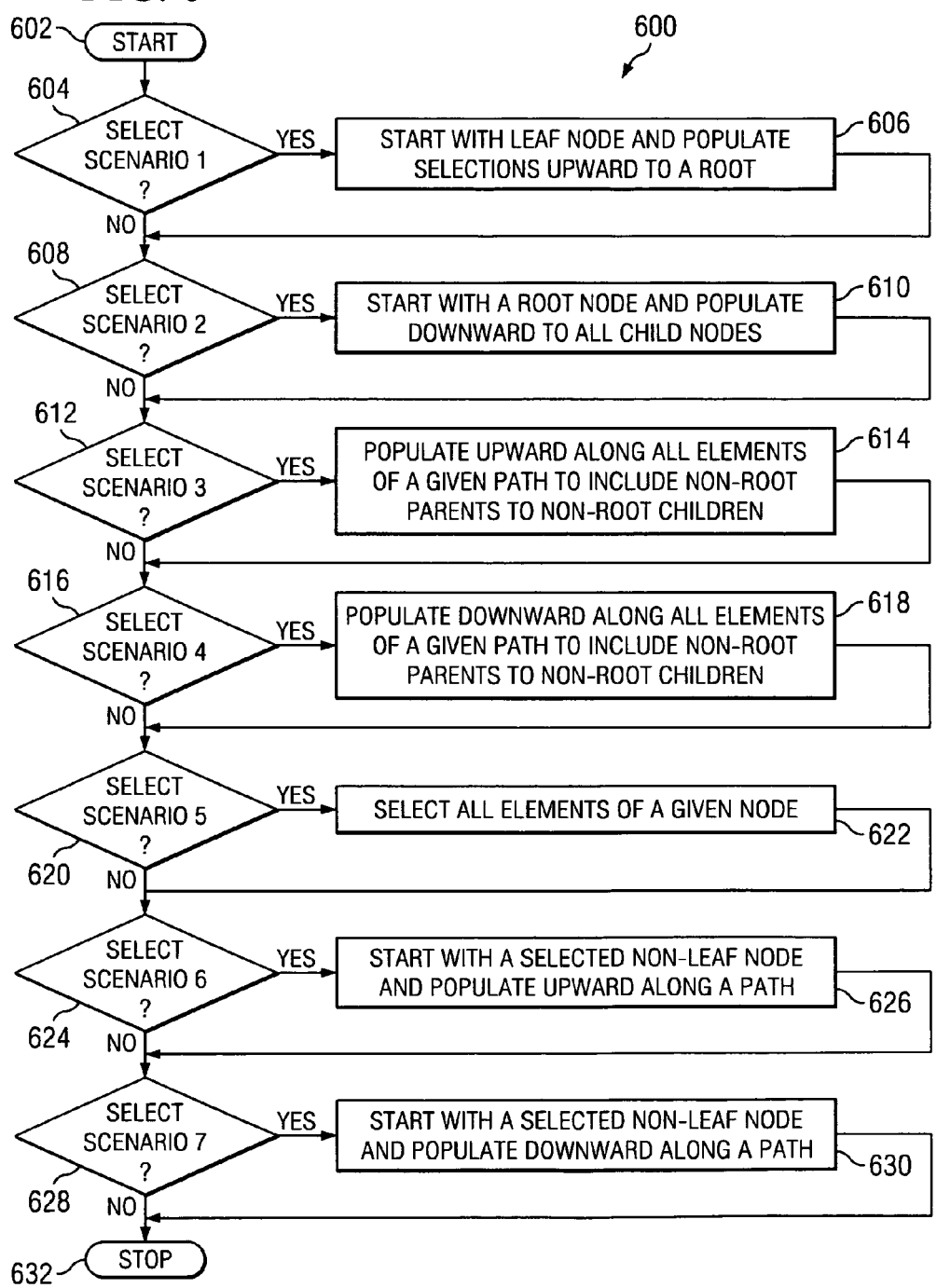
FIG. 6 is a flowchart for selection of tagging scenarios.

FIG. 6 depicts a flow chart for selection of tagging scenarios (see FIG. 5, step 516 of TA 500). By way of example, such tagging scenarios may include the following: (1) starting with a leaf node and populating selections upward to a root (604 and 606); (2) starting with a root node and populating downward to all child nodes (608 and 610); (3) populating upward or downward along all elements of a given path (to include non-root parents to non-root children) (612 and 614; 616 and 618); (5) selecting all peer elements of a given node (620 and 622); and (5) starting with a given, non-leaf node and populating upward or downward along a path (624 and 626; 628 and 630).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method for returning a tagged facet tree to an end user who is only authorized to access an authorized portion of the facet tree, comprising:

receiving, at a server computer, a facet tree from a facet tree database;

acquiring, from a rules database connected to the server, a first rule for the facet tree, and a second rule for a plurality of tagging scenarios based on a characteristic of the end user;

applying the first rule to the facet tree before presentation to the end user on a user interface such that only the authorized portion of the facet tree is displayed to the end user, and applying the second rule to the plurality of tagging scenarios such that only a tagging scenario that is applicable to the characteristic of the end user is displayed to the end user;

making the tagging scenario available to the end user at a user interface connected to the server;

responsive to the end user indicating that the tagging scenario is to be applied to the authorized portion of the facet tree, applying the tagging scenario to populate the tagging of elements in the facet tree for the end user in accordance with the tagging scenario;

when the tagging has been populated, returning the tagged facet tree to the end user at the user interface;

wherein the end user validates or invalidates the tagged facet tree;

wherein a facet tree is a categorization scheme for a plurality of hierarchically structured data and content records where a plurality of facets and a plurality of facet elements of the facet tree guide a search; and wherein tagging means assigning a value to a word or a data record to select the word as a facet or a facet element, linking the facet or facet element to another to facet or facet element, or linking a data record to a facet element.

\* \* \* \* \*